(12) United States Patent
Ma

(10) Patent No.: US 7,453,884 B2
(45) Date of Patent: *Nov. 18, 2008

(54) APPARATUS AND METHOD FOR SCALABLE AND DYNAMIC TRAFFIC ENGINEERING IN A DATA COMMUNICATION NETWORK

(75) Inventor: Qingming Ma, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 10/958,920

(22) Filed: Oct. 4, 2004

(65) Prior Publication Data

US 2005/0083936 A1   Apr. 21, 2005

Related U.S. Application Data

(63) Continuation of application No. 09/558,693, filed on Apr. 25, 2000, now Pat. No. 7,123,620.

(51) Int. Cl.
H04L 12/66 (2006.01)
(52) U.S. Cl. ................... 370/395.32; 370/392; 370/401
(58) Field of Classification Search ............... 370/238, 370/392, 401, 475, 395.32, 393, 389, 397, 370/399, 395.31, 400; 709/238–244; 711/202–205, 711/213–214, 217, 220–221
See application file for complete search history.

(56) References Cited

U.S. PATENT DOCUMENTS 4,794,594 A   12/1988   Picard
5,088,032 A   2/1992   Bosack
5,095,480 A   3/1992   Fenner (Continued)

FOREIGN PATENT DOCUMENTS

EP   0 567 217   10/1993

(Continued)

OTHER PUBLICATIONS

Allen, M., Novell IPX Over Various WAN Media (IPXWAN), Dec. 1993, Novell, Inc., Network Working Group, pp. 1-22.

(Continued)

*Primary Examiner*—Chi H. Pham
*Assistant Examiner*—Kevin Mew
(74) *Attorney, Agent, or Firm*—Thelen LLP; David B. Ritchie

(57) ABSTRACT

A global path identifier is assigned to each explicit route through a data communication network. The global path identifier is inserted into each packet as the packet enters a network and is used in selecting the next hop. When encountering a new selected path, an ingress router sends an explicit object to downstream nodes of the path to set up explicit routes by caching the next hop in an Explicit Forwarding Information Base ("EFIB") table. Ingress routers maintain an Explicit Route Table ("ERT") that tracks the global path identifier associated with each flow through the network. Multiple flows using the same path can be implemented by sharing the same global path identifier. In case of sudden network load changes, rerouting can be performed by changing the global path identifier associated with those flows that need to be rerouted and by then transmitting a new path object to downstream nodes.

38 Claims, 8 Drawing Sheets

U.S. PATENT DOCUMENTS

| | | | |
|---|---|---|---|
| 5,249,178 A | 9/1993 | Kurano et al. | |
| 5,274,631 A | 12/1993 | Bhardwaj | |
| 5,274,643 A | 12/1993 | Fisk | |
| 5,280,480 A | 1/1994 | Pitt et al. | |
| 5,291,482 A | 3/1994 | McHarg et al. | |
| 5,303,237 A | 4/1994 | Bergman et al. | |
| 5,317,562 A | 5/1994 | Nardin et al. | |
| 5,331,637 A | 7/1994 | Francis et al. | |
| 5,345,446 A | 9/1994 | Hiller et al. | |
| 5,361,256 A | 11/1994 | Doeringer et al. | |
| 5,361,259 A | 11/1994 | Hunt et al. | |
| 5,408,469 A | 4/1995 | Opher et al. | |
| 5,426,637 A | 6/1995 | Derby et al. | |
| 5,428,607 A | 6/1995 | Hiller et al. | |
| 5,430,715 A | 7/1995 | Corbalis et al. | |
| 5,452,297 A | 9/1995 | Hiller et al. | |
| 5,477,536 A | 12/1995 | Picard | |
| 5,524,254 A | 6/1996 | Morgan et al. | |
| 5,550,816 A * | 8/1996 | Hardwick et al. | 370/397 |
| 5,583,862 A | 12/1996 | Callon | |
| 5,610,910 A | 3/1997 | Focsaneanu et al. | |
| 5,617,421 A | 4/1997 | Chin et al. | |
| 5,740,171 A | 4/1998 | Mazzola et al. | |
| 5,764,756 A | 6/1998 | Onweller | |
| 5,802,047 A | 9/1998 | Kinoshita | |
| 5,802,316 A | 9/1998 | Ito et al. | |
| 5,867,495 A | 2/1999 | Elliott et al. | |
| 5,872,783 A * | 2/1999 | Chin | 370/395.32 |
| 5,959,990 A | 9/1999 | Frantz et al. | |
| 6,026,087 A | 2/2000 | Mirashrafi et al. | |
| 6,091,725 A | 7/2000 | Cheriton et al. | |
| 6,151,324 A | 11/2000 | Belser et al. | |
| 6,201,810 B1 * | 3/2001 | Masuda et al. | 370/395.32 |
| 6,408,001 B1 | 6/2002 | Chuah et al. | |
| 6,463,062 B1 * | 10/2002 | Buyukkoc et al. | 370/395.1 |
| 6,522,630 B1 | 2/2003 | Ooms et al. | |
| 6,526,056 B1 | 2/2003 | Rekhter et al. | |
| 6,680,943 B1 * | 1/2004 | Gibson et al. | 370/392 |
| 6,985,960 B2 * | 1/2006 | Takashima et al. | 709/238 |
| 7,154,889 B1 * | 12/2006 | Rekhter et al. | 370/392 |
| 7,158,524 B2 * | 1/2007 | Buyukkoc et al. | 370/395.1 |
| 2001/0021190 A1 | 9/2001 | Hummel | |
| 2002/0051458 A1 * | 5/2002 | Carvey et al. | 370/401 |
| 2002/0091855 A1 | 7/2002 | Yemini et al. | |
| 2002/0163889 A1 | 11/2002 | Yemini et al. | |

FOREIGN PATENT DOCUMENTS

| | | |
|---|---|---|
| WO | 95/20850 | 8/1995 |
| WO | 97/38511 | 10/1997 |

OTHER PUBLICATIONS

Awduche, et al., "Requirements for Traffic Engineering Over MPLS", Jun. 1999, Internet Engineering Task Force, Internet Draft, MPSL Working Group, Category: Informational, pp. 1-28.

Doeringer, Willibald, et al., "Routing on Longest-Matching Prefixes", Feb. 1996, IEEE/ACM Transactions on Networking, vol. 4, No. 1, pp. 86-97.

Rosen, et al., "Multiprotocol Label Switching Architecture", Apr. 1999, Network Working Group, Internet-Draft, pp. 1-62.

* cited by examiner

| EXPLICIT ROUTE TABLE ("ERT") | | |
|---|---|---|
| SOURCE/DESTINATION PAIR | (ROUTE) | GLOBAL PATH ID |
| <S1, D1> | R1, R3, R8 | 1010 |
| <S2, D1> | R2, R3, R8 | 1001 |
| <S3, D1> | R2, R4, R3, R8 | 1101 |
| <S4, D1> | R2, R1, R3, R8 | 1000 |
| <S2, D2> | R2, R4, R6, R7 | 0111 |
| ⋮ | ⋮ | ⋮ |
| 810 | 820 | 830 |

EXPLICIT FORWARDING INFORMATION BASE ("EFIB")

| INCOMING GLOBAL PATH ID | OUTGOING GLOBAL PATH ID | NEXT HOP |
|---|---|---|
| 1010 | 1011 | R3 |
| ⋮ | ⋮ | ⋮ |
| <u>910</u> | <u>920</u> | <u>930</u> |

…

APPARATUS AND METHOD FOR SCALABLE AND DYNAMIC TRAFFIC ENGINEERING IN A DATA COMMUNICATION NETWORK

CROSS-REFERENCE TO RELATED APPLICATIONS

This application is a continuation application based on U.S. patent application Ser. No. 09/558,693, filed Apr. 25, 2000 now U.S. Pat. No. 7,123,620.

BACKGROUND OF THE INVENTION

1. Field of the Invention

The present invention relates to data communication networks. More particularly, the present invention relates to a scalable apparatus and method for dynamic selection of explicit routes and dynamic rerouting in data communication networks and internetworks such as the Internet.

2. Background

As is known to those of ordinary ski in the art, a network is a communication system that allows users to access resources on other computers and exchange messages with other users. A network is typically a data communication system that links two or more computers and peripheral devices. It allows users to share resources on their own systems with other network users and to access information on centrally located systems or systems that are located at remote offices. It may provide connections to the Internet or the networks of other organizations. The network typically includes a cable that attaches to network interface cards ("NICs") in each of the devices within the network. Users may interact with network-enabled software applications to make a network request (such as to get a file or print on a network printer). The application may also communicate with the network software, which may then interact with the network hardware to transmit information to other devices attached to the network.

FIG. 1 is a block diagram illustrating an exemplary network 100 connecting a user 110 and a particular web page 120. FIG. 1 is an example that may be consistent with any type of network known to those of ordinary skill in the art, including a Local Area Network ("LAN"), a Wide Area Network ("WAN"), or a combination of networks, such as the Internet.

When a user 110 connects to a particular destination, such as a requested web page 120, the connection from the user 110 to the web page 120 is typically routed through several internetworking devices such as routers 130-A-130-I. Routers are typically used to connect similar and heterogeneous network segments into internetworks. For example, two LANs may be connected across a dialup, integrated services digital network ("ISDN"), or across a leased line via routers. Routers may also be found throughout internetwork known as the Internet End users may connect to a local Internet service provider ("ISP") (not shown).

As shown in FIG. 1, multiple routes are possible to transmit information between user 110 and web page 120. Networks are designed such that routers attempt to select the best route between computers such as the computer where user 110 is located and the computer where web page 120 is stored. For example, based on a number of factors known to those of ordinary skill in the art, the route defined by following routers 130-A, 130-B, 130-C, and 130-D may be selected. However, the use of different routing algorithms may result in the selection of the route defined by routers 130-A, 130-E, 130-F, and 130-G, or possibly even the route defined by routers 130-A, 130-B, 130-H, 130-I, 130-F, and 130-G. A detailed discussion of the aspects of routing algorithms that determine the optimal path between two nodes on a network is not necessary for the purposes of the present invention, and such a discussion is not provided here so as not to overcomplicate the present disclosure.

Routers such as routers 130-A-130-I typically transfer information along data communication networks using formatted data packets. For example, when a "source" computer system (e.g., computer 110 in FIG. 1) wishes to transmit information to a "destination" computer system (e.g., computer 120 in FIG. 1), it generates a packet header in an appropriate format which typically includes the address of the source and destination end system, and then fills the remainder of the packet with the information to be transmitted. The complete data packet is then transmitted to the router attached to (and responsible for) the source computer system, which forwards it toward the destination computer system. Packets transmitted among the routers themselves (typically referred to as "control packets") are similarly formatted and forwarded.

When a router receives a data packet, it reads the data packet's destination address from the data packet header, and then transmits the data packet on the link leading most directly to the data packet's destination. Along the path from source to destination, a data packet may be transmitted along several links and pass through several routers, with each router on the path reading the data packet header and then forwarding the data packet on to the next "hop."

To determine how data packets should be forwarded, each router is typically aware of the locations of the network's end systems (i.e., which routers are responsible for which end systems), the nature of the connections between the routers, and the states (e.g., operative or inoperative) of the links forming those connections. Using this information, each router can compute effective routes through the network and avoid, for example, faulty links or routers. A procedure for performing these tasks is generally known as a "routing algorithm."

FIG. 2 is a block diagram of a sample router 130 suitable for implementing an embodiment of the present invention. The router 130 is shown to include a master control processing unit ("CPU") 210, low and medium speed interfaces 220, and high speed interfaces 230. The CPU 210 may be responsible for performing such router tasks as routing table computations and network management. It may include one or more microprocessor integrated circuits selected from complex instruction set computer ("CISC") integrated circuits, reduced instruction set computer ("RISC") integrated circuits, or other commercially available processor integrated circuits. Non-volatile RAM and/or ROM may also form a part of CPU 210. Those of ordinary skill in the art will recognize that there are many alternative ways in which such memory can be coupled to the system.

The interfaces 220 and 230 are typically provided as interface cards. Generally, they control the transmission and reception of data packets over the network, and sometimes support other peripherals used with router 130. Examples of interfaces that may be included in the low and medium speed interfaces 220 are a multiport communications interface 222, a serial communications interface 224, and a token ring interface 226. Examples of interfaces that may be included in the high speed interfaces 230 include a fiber distributed data interface ("FDDI") 232 and a multiport Ethernet interface 234. Each of these interfaces (low/medium and high speed) may include (1) a plurality of ports appropriate for communication with the appropriate media, and (2) an independent processor, and in some instances (3) volatile RAM. The independent processors may control such communication intensive tasks as packet switching and filtering, and media control and management. By providing separate processors for the communication intensive tasks, this architecture permits the master CPU 210 to efficiently perform routing computations, network diagnostics, security functions, and other similar functions.

The low and medium speed interfaces are shown to be coupled to the master CPU 210 through a data, control, and address bus 240. High speed interfaces 230 are shown to be connected to the bus 240 through a fast data, control, and address bus 250, which is in turn connected to a bus controller 260. The bus controller functions are typically provided by an independent processor.

Although the system shown in FIG. 2 is an example of a router suitable for implementing an embodiment of the present invention, it is by no means the only router architecture on which the present invention can be implemented. For example, an architecture having a single processor that handles communications as well as routing computations would also be acceptable. Further, other types of interfaces and media known to those of ordinary skill in the art could also be used with the router.

At a higher level of abstraction, FIG. 3 is a block diagram illustrating a model of a typical router system that is applicable in the context of the present invention. As shown in FIG. 3, a networking device such as a router 130 may be modeled as a device having a plurality of input interfaces 310a-310n, each having a corresponding input interface queue 320a-320n. Each input interface 310 receives a stream 330a-330n of data packets 340a-340z, with each data packet 340 typically arriving at a variable rate and typically having a variable length (usually measured in bytes). In addition to the data "payload" in each packet, each packet contains header information, which typically includes a source address and a destination address. Currently, the dominant protocol for transmitting such data packets is the Internet Protocol ("IP"). However, as will be described more fully in subsequent portions of this document, embodiments of the present invention can be implemented using any routing protocol known to those of ordinary skill in the art.

As each new data packet 340 arrives on an interface 310k, it is written into a corresponding input interface queue 320k, waiting for its turn to be processed. Scheduling logic 350 determines the order in which input interfaces 310a-310n should be "polled" to find out how many data packets (or equivalently, how many bytes of data) have arrived on a given interface 310k since the last time that interface 310k was polled. Scheduling logic 350 also determines the amount of data that should be processed from a given interface 310k during each "polling round."

Regardless of the specific form of scheduling logic 350 used, when scheduling logic 350 determines that a particular data packet 340i should be processed from a particular input interface queue 320k, scheduling logic 350 transfers the data packet 340i to subsequent portions of the networking device (shown as dashed block 355) for further processing. Eventually, data packet 340i is written into one of a plurality of output queues 360a-360q, at the output of which the data packet 340i is finally transmitted from the networking device the corresponding output interface 370a-370q. Fundamentally, then, the packet forwarding component of a router performs the function of examining the source and destination address of each data packet and identifying one from among a plurality of output interfaces 370a-370q on which to transmit each data packet.

FIG. 4 is a flow chart illustrating a more detailed view of the packet forwarding operations performed on a typical router.

As shown in FIG. 4, at step 405, a data frame is received, and in step 410, it is stripped of all its data link layer frame information. The exposed data field then contains the actual network layer data packet. Next, at step 415, the network layer protocol is identified. As mentioned earlier, there are several network layer protocols that may be routed in a data communication network, with the Internet Protocol ("IP") being dominant in current wide area networks such as the Internet.

Still referring to FIG. 4, after identifying the network protocol in step 415, the router determines whether the protocol is one that can be routed in step 420. If the protocol is not one that can be routed, then at step 425, the link layer header is added back to the received data frame, and at step 430 the frame is simply transmitted using link layer techniques known to those of ordinary skill in the art, such as switching or bridging.

If the packet protocol is determined to one that can be routed in step 420 (e.g., if it is an IP packet), then at step 435, the router first performs housekeeping functions known to those of ordinary skill in the art, and then the router "looks up" the destination IP address in its routing table to identify the appropriate router output interface (also called a "port") on which to transmit the received packet. At step 440, the router determines whether the destination port is directly attached to the router. If so (i.e., if the destination port is another port on the router), then at step 445, the link layer header is added back to the packet with the original link layer destination address, and then at step 450 the reassembled link layer frame is transmitted through the port identified at step 435.

Otherwise, if at step 440 the router determines that the destination port is not directly attached to the router (indicating that another router hop needs to occur), the Media Access Control ("MAC") address of the next hop may be added to the packet, and a new link layer header with this MAC destination address extracted from the routing table is added to the frame at step 455, and then at step 460 the frame is transmitted through the port identified at step 435.

With the integration of voice, video, and data traffic, the aggregate bandwidth requirement of applications is getting higher. More network infrastructures are being built with high-end routers and switches with a large number of interfaces. As a result, network connectivity is getting richer than ever before. Multiple selections of routes for any given source and destination pair are often available. However, as is known to those of ordinary skill in the art, existing routing protocols, such as the Open Shortest Path First ("OSPF") protocol, the Routing Information Protocol ("RIP"), the Enhanced Interior Gateway Routing Protocol, and the Border Gateway Protocol ("BGP") are essentially destination-based routing protocols, which means that all packets with the same destination are typically forwarded along a minimum-hop path to their destination.

With destination-based routing protocols, routes are typically calculated automatically at regular intervals by software in routing devices. To enable this type of dynamic routing, routing devices contain routing tables, which essentially consist of destination address/next hop pairs. As an example, an entry in a routing table (i.e., a routing table as used in step 435 of FIG. 4) may be interpreted as follows: to get to network IP address 123.045.0.0, send the packet out Ethernet interface '0' (e.g., "E0"). Thus, IP datagrams, or packets, travel through internetworks one hop at a time. The entire route is not known at the onset of the journey, however. Instead, at each hop, the next destination is calculated by matching the destination address within the datagram with an entry in the current node's routing table. Each node's involvement in the routing process is limited to forwarding packets based on internal information. The nodes typically do not monitor whether the packets get to their final destination, nor does the IP protocol have the capability to report errors back to the source when routing anomalies occur.

Although networks are designed to match expected traffic load, the actual traffic load in data communication networks changes dynamically depending on the time of day, and from day to day as well. A special event (e.g., the final game of the soccer World Cup) can dramatically change the network traffic pattern. In addition, network devices can become disabled or may be added to a network, and these events can also change the network traffic pattern.

As is known to those of ordinary skill in the art, destination-based minimum-hop routing algorithms (such as OSPF, RIP, and BGP) typically select the "shortest path" to a destination based on a metric such as hop count. These protocols therefore have limited capacity to balance the network load. With these protocols, when the traffic load is concentrated, some links are heavily loaded, while others sit idle. Thus, when using these routing algorithms, a network cannot dynamically adjust its forwarding paths to avoid congested links.

Traffic engineering is an important network service that achieves network resource efficiency by directing certain traffic flows to travel through explicitly defined routes that are different from the default paths determined by the routing protocols (e.g., OSPF, EIGRP, or BGP). As is known to those of ordinary skill in the art, the key to successful traffic engineering is the ability to have a set of network mechanisms that supports both explicit routes and dynamic rerouting. Dynamic rerouting refers to the ability to periodically recalculate routes in a data communication network depending on network load or other factors.

Fundamentally, traffic engineering is a function of routing. However, existing destination-based routing protocols, such as the protocols already mentioned, make it very difficult—if not impossible—to support explicit routes.

One current approach proposed by the Internet Engineering Task Force ("IETF") toward supporting explicit routes in traffic engineering applications is to use the multiple label switching ("MPLS") technique and the Resource Reservation Protocol ("RSVP") to set up explicit routes. MPLS and RSVP are not discussed in detail in this document, so as not to overcomplicate the present discussion. For the purposes of the present discussion, however, suffice it to say that in both the MPLS and RSVP techniques, a technique known as "tag switching" can be used, wherein explicit routes are cached in Tag Information Base ("TIB") entries. In general, tag switching techniques work as follows: at the edge of a tag-switched network, a tag is applied to each packet A tag has only local significance. When a packet is received by a tag switch (e.g., a router or ATM switch with tag switching software), the switch performs a table look-up in the TIB. Each entry in the TIB consists of an incoming tag and one or more subentries of the form: outgoing tag, outgoing interface, outgoing link layer information. The tag switch replaces the tag in the packet with the outgoing tag and replaces the link layer information. The packet is then sent out on the given outgoing interface. It should be noted that the TIB is built at the same time that the outing tables are populated, not when the tag is needed for the first time, which allows flows to be switched starting with the first packet.

According to the tag switching techniques that can be implemented with MPLS and RSVP, at each node in a route, an incoming packet is forwarded along the explicit route to the next hop stored in the TIB whose index tag matches the tag in the packet header. However, the main problem with this approach is its inherent complexity. Both RSVP and MPLS are very complicated and computationally intensive protocols, and they must be extended in order to support explicit routes. Moreover, to support traffic engineering, a network must support both the RSVP and MPLS protocols, and this can significantly limit the scope of traffic engineering available. This is because new service models, such as differentiated services, do not require the hop-by-hop signaling provided by RSVP. Moreover, this approach to supporting dynamic traffic engineering (i.e., making routing decision on a "per-flow" basis), is inflexible and expensive. Moreover, as is known to those of ordinary skill in the art, the current approach is not scalable because the size of the TIB that is required for a network with a given number of nodes grows exponentially as a function of the number of nodes.

The present invention provides a technique for scalable and dynamic rerouting that significantly reduces the complexity of traffic engineering as currently proposed in the IETF. As described herein, according to aspects of the present invention, a global path identifier is assigned to each explicit route in a data communication network. In one embodiment, this global path identifier is inserted in the optional field of an IP packet header, and is used in selecting the next hop by a router's forwarding engine. As another example, the global path identifier can be inserted as a label in MPLS systems. Explicit routes can be selected either by a policy server or by ingress routers. When encountering a new selected path, an ingress router sends an explicit object to downstream nodes of the path to set up explicit routes by caching the next hop in an Explicit Forwarding Information Base ("EFIB") table in each router along the route. Two explicit routes that merge at a network node will share the same entry in the EFIB tables in all downstream nodes. Ingress routers maintain an Explicit Route Table ("ERT") table that tracks the global path identifier associated with each flow through the data communication network. Multiple flows using the same path can be implemented by sharing the same global path identifier in the table. In case of sudden network load changes, rerouting can be performed by changing the global path identifier associated with those flows that need to be rerouted, and by then transmitting a new path object to downstream nodes.

Compared with the existing approach, the technique according to aspects of the present invention is routing protocol independent, scalable, and dynamic, and it can support both class-based and flow-based explicit routes. These and other features and advantages of the present invention will be presented in more detail in the following specification of the invention and in the associated figures.

SUMMARY OF THE INVENTION

A global path identifier is assigned to each explicit route through a data communication network. This global path identifier can be obtained by performing the bitwise Exclusive OR function of all of the unique identifiers, such as IP addresses, of all the nodes along each explicit route. The global path identifier is inserted into each packet as the packet enters a network, and is used in selecting the next hop by a router's forwarding engine. Explicit routes can be selected either by a policy server or by ingress routers. When encountering a new selected path, an ingress router sends an explicit object to downstream nodes of the path to set up explicit routes by caching the next hop in an Explicit Forwarding Information Base ("EFIB") table in each router along the route. Two explicit routes that merge at a network node will share the same entry in the EFIB tables in all downstream nodes. Ingress routers maintain an Explicit Route Table ("ERT") table that tracks the global path identifier associated with each flow through the data communication network. Multiple flows using the same path can be implemented by sharing the same global path identifier in the table. In case of sudden network load changes, rerouting can be performed by changing the global path identifier associated with those flows that need to be rerouted, and by then transmitting a new path object to downstream nodes.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to an implementation of the present invention as illustrated in the accompanying drawings. The same reference numbers will be used throughout the drawings and the following description to refer to the same or like parts.

Figure 5:
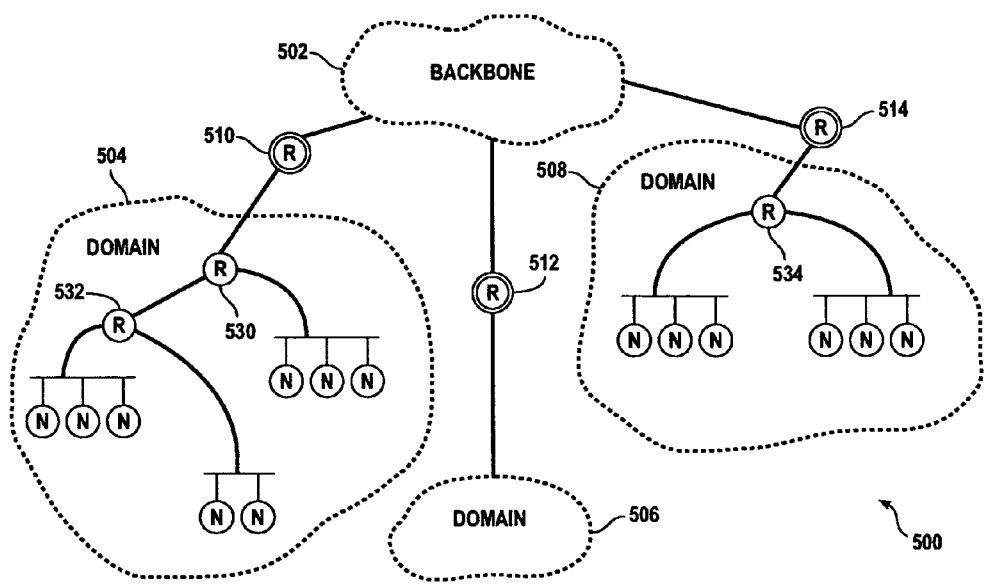
FIG. 5 is a block diagram of a typical computer internetwork including a collection of domains having one or more local networks.

As is known to those of ordinary skill in the art, internetworking is the process of establishing and maintaining communications between and transferring data among multiple local networks in a distributed network system. FIG. 5 depicts an exemplary embodiment of an internetwork system 500, comprising a plurality of routing domains 504-508 coupled to a backbone network 502. In the hierarchically-arranged distributed internetwork system 500, backbone 502 is the top-level, or central, connection path shared by the nodes and networks connected to it. The backbone manages the bulk of the traffic between communicating nodes to provide end-to-end service between one user (i.e., a source node) and another user (i.e., a destination node). Each routing domain in the internetwork is a collection of one or more local networks that are attached to the backbone through one or more routers. Routing domains are also referred to as "customer networks," or "autonomous systems."

The routers within a routing domain manage communications among local networks within their domain and communicate with each other using an intra-domain routing protocol. As is known to those of ordinary skill in the art, examples of such protocols are the IP Routing Information Protocol ("RIP") and the International Standards Organization ("ISO") Integrated Intermediate System-to-Intermediate System ("IS-IS") routing protocol.

Domains 504-508 are connected to the backbone 502 through router nodes 510, 512 and 514, respectively. The routing protocols implemented in such routers are referred to as inter-domain routing protocols. An example of an inter-domain routing protocol is the Inter-domain Routing Protocol ("IDRP"), wherein in IP, the Exterior Gateway Protocol ("EGP") and the Border Gateway Protocol ("BGP") routing protocols are known to those of ordinary skill in the art. Although not shown in FIG. 5, more than one inter-domain router may be used to connect a domain to the backbone. Such a configuration is often encouraged for redundancy purposes.

Thus, the hierarchically-arranged distributed internetwork system 500 contains levels of subnetworks, each having an associated routing level. The lower routing level includes intra-domain routers 530-534 which manage individual links and nodes within their respective domains. The higher routing level includes inter-domain routers 510-514 which manage all the lower-level domains without addressing details internal to lower routing levels. Communications among these routers typically comprises an exchange (i.e., "advertising") of routing information. This exchange occurs between routers at the same routing level (referred to as "peer" routers) as well as between routers at different routing levels.

In order to reduce design complexity, most networks are organized as a series of hardware and software levels, or "layers," within each node. These layers interact to format data for transfer between, for example, a source node and a destination node communicating over the network. Specifically, predetermined services are performed on the data as it passes through each layer and the layers communicate with each other by means of predefined protocols. This layered design permits each layer to offer selected services to other layers using a standardized interface that shields those layers from the actual implementation details of the services.

As was mentioned earlier, the destination address typically stored in the header of a data packet can be used by the network layer protocols to determine the route for the packet. As is known to those of ordinary skill in the art when a packet is received at the network layer, that layer examines the network layer header of the packet, determines the next hop that the packet should take based upon the destination address, appends a new network layer header onto the packet as necessary, and passes the modified packet to the data link layer responsible for the outgoing link associated with the next hop.

Since network layer addresses are hierarchical in nature, network layer protocols that perform routing functions at the same routing level of an internetwork make next hop determination based upon the same portion of the destination address referred to as the destination address prefix. The routing information exchanged by peer routers typically includes this destination address prefix.

In conventional routers, these destination address prefixes are stored in a forwarding information database ("FIB"). To determine the next hop, network layer protocols typically implement a longest-matching-address-prefix ("longest match") algorithm that searches the forwarding database for an entry corresponding to the destination address located in the network layer header. The data structure of the forwarding database comprises a large number of "branches," each representing a string of the hierarchical destination address fields. The branches of the database have different address field values and/or terminate with a different number of address fields. The longest match algorithm must traverse numerous branches during this address matching process to determine the next hop. Due to the hierarchical characteristics of destination addresses, there may be several destination address prefixes in the forwarding database that match at least a portion of a particular destination address. As a result, the longest address in the forwarding database must be found.

As is known to those of ordinary skill in the art, the time required to search the forwarding database is proportional to the average length of the destination address in the database. Destination addresses often have a significant number of bits, particularly in large, hierarchically-arranged internetworks. Due to the length of the destination addresses, as well as the manner in which the longest match algorithm navigates the forwarding database, the address matching functions contribute significantly to the overhead associated with the packet forwarding process performed by network layer protocols, thereby adversely affecting the router's efficiency.

Figure 1:
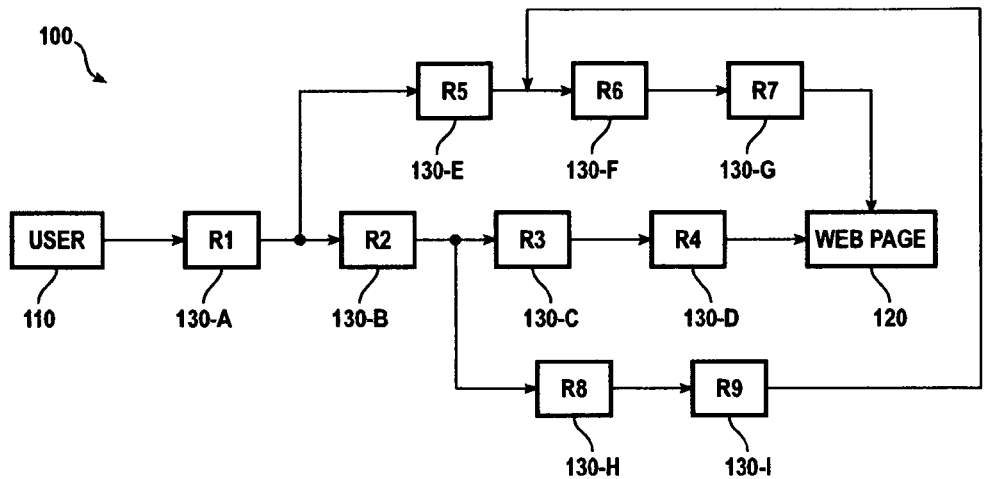
FIG. 1 is a block diagram illustrating an exemplary network connection between a user and a web page.
Figure 2:
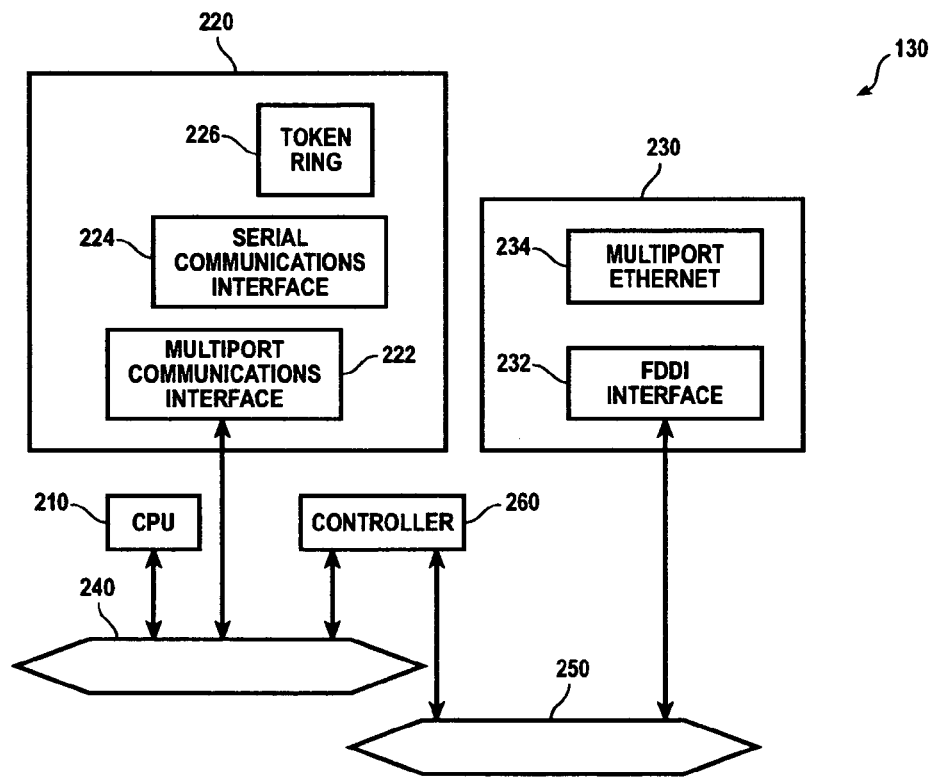
FIG. 2 is a block diagram of an exemplary router suitable for implementing an embodiment of the present invention.
Figure 3:
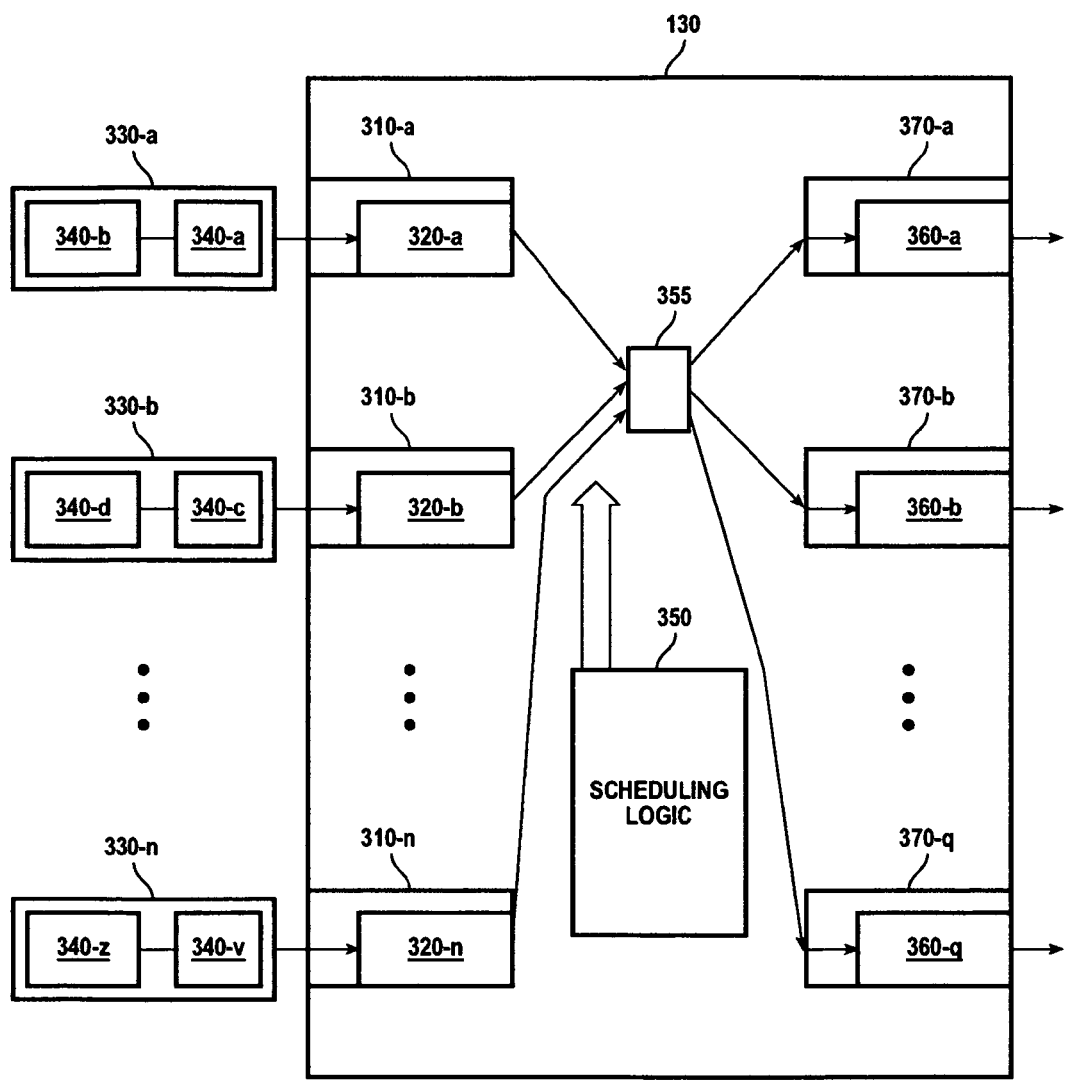
FIG. 3 is a block diagram illustrating a packet processing model in a typical router having multiple input interfaces and multiple output interfaces suitable for implementing an embodiment of the present invention.
Figure 4:
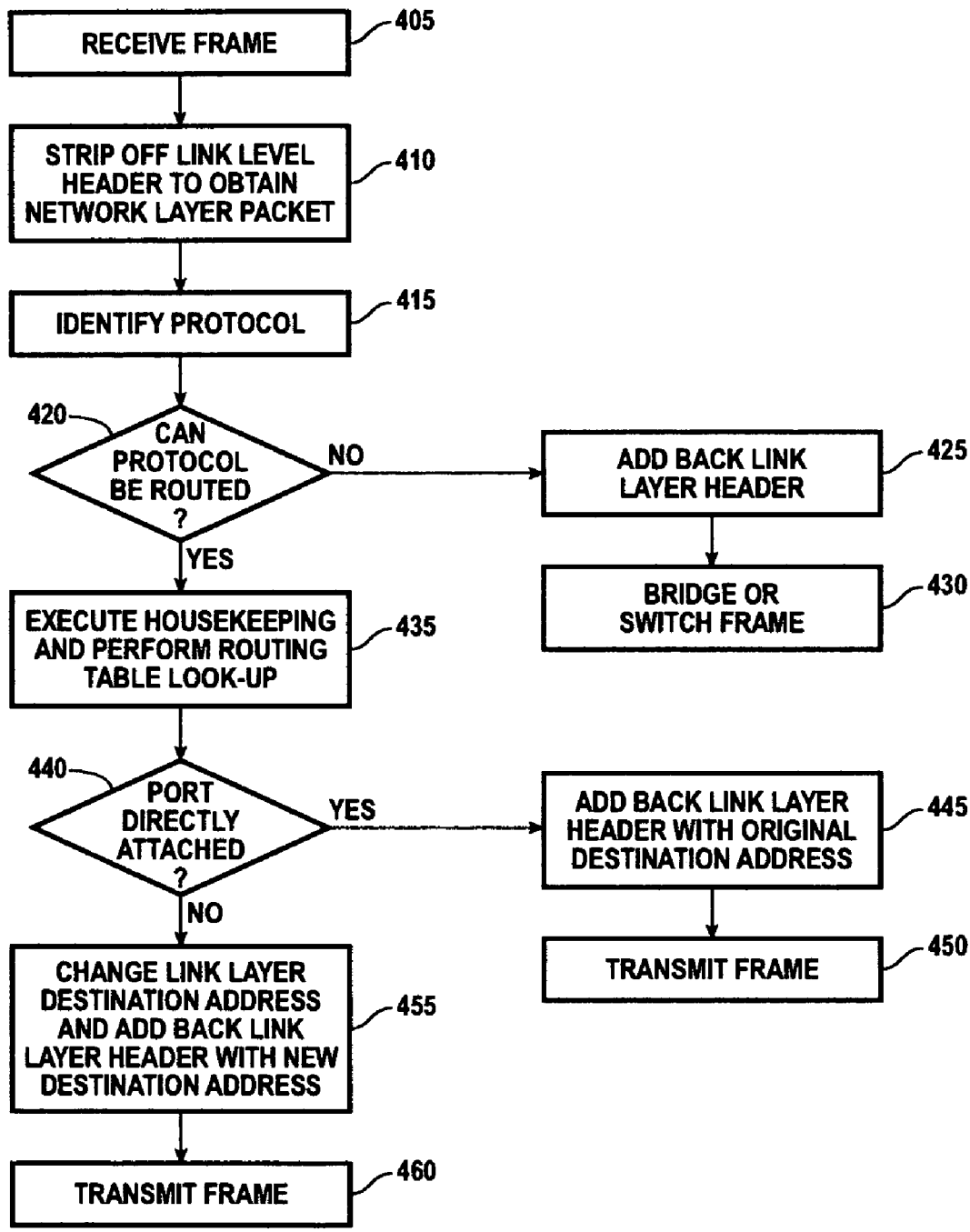
FIG. 4 is a flow chart illustrating a typical packet forwarding operation in a router suitable for implementing an embodiment of the present invention.
Figure 6:
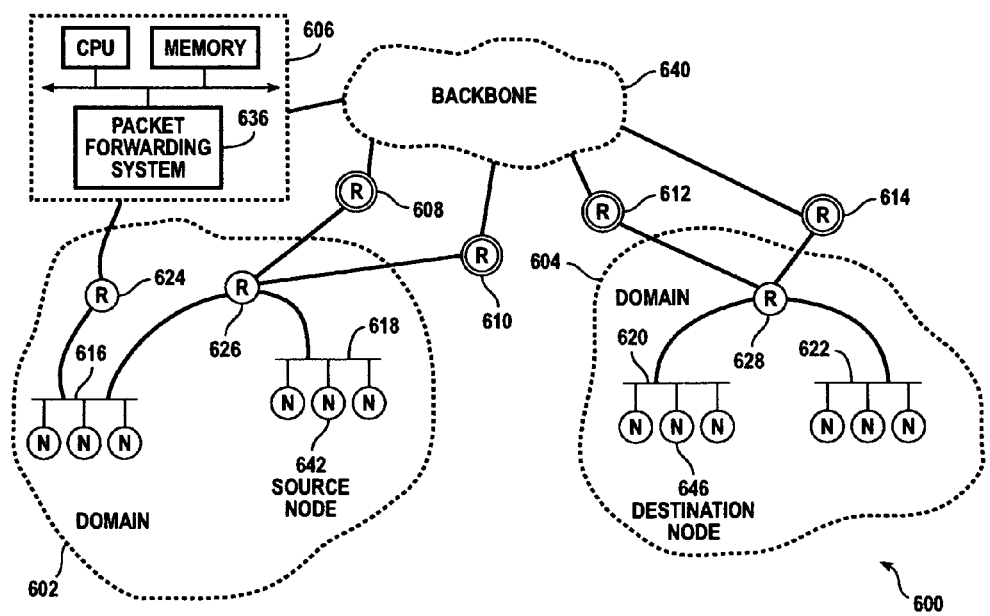
FIG. 6 is a block diagram of a computer internetwork including a collection of domains connected to a backbone via one or more routers.

FIG. 6 is a block diagram of an internetwork system 600 comprising a collection of domains 602-604 containing a number of local computer networks 616-622, each having one or more nodes, such as workstations and servers. The local networks are connected by intermediate nodes, such as intra-domain routers 624-628 and inter-domain routers 606-614 implementing the techniques of the present invention. Each intra-domain router 624-628 and each inter-domain router 606-614 may have a hardware architecture similar to that shown in FIG. 2 and described earlier.

Although all routers perform similar tasks, there are some important hardware and software differences between the functions performed by intra-domain routers and inter-domain routers. Inter-domain routers, also known as "edge routers," or "ingress routers," are primarily concerned with network topology and maintenance, while intra-domain routers, also known as "core routers" are primarily devoted to packet forwarding.

As shown in FIG. 6, intra-domain routers 624-626 manage communications among local networks 616, 618 within domain 602 and communicate with each other using an intra-domain routing protocol, such as RIP or IS-IS. Inter-domain routers 606-614 connect domains 602 and 604 to the backbone 640 and communicate with each other using an inter-domain routing protocol, such as IDRP, EGP or BGP. Peer routers exchange (i.e., advertise) routing information with each other and maintain the routing information in a forwarding information database ("FIB") discussed below.

The routers include connectionless network layer protocols such as the connectionless network layer protocol ("CLNP"), the Internet Protocol ("IP") network layer protocol and the Internetwork Packet Exchange ("IPX") protocol. Connectionless network layer protocols exchange routing information with each other using neighbor greeting protocols such as the Address Resolution Protocol ("ARP"). This information is stored in the forwarding information database and used by the network layer protocols to determine paths through the internetwork 600.

Primarily, when an inter-domain router receives a packet from a previous hop inter- or intra-domain router, it determines the next hop inter- or intra-domain router to which to forward the packet using a packet forwarding system 636, of which many are known to those of ordinary skill in the art. Similarly, intra-domain routers forward packets between a previous hop inter-domain router and the end nodes, making next hop determination using the packet forwarding system 636. For example, as shown in FIG. 6, intra-domain router 626 forwards packets originating at source node 642 to inter-domain router 608, which then forwards the packet through backbone 640 to, for example, inter-domain router 612, which then forwards the packet to intra-domain router 628, which then finally transfers the packet to destination end node 646. As will be described in more detail below, the present invention may be implemented in both intra-domain and inter-domain routers or other network devices.

The present invention employs a novel approach to support dynamic selection of explicit routes and dynamic rerouting in the Internet. The proposed technique is simple and scalable. It can support both flow-based and class-based dynamic traffic engineering. The technique is independent of existing routing protocols, but uses the route selected by existing routing protocols as default routes. Hence, it can be used in both intra-domain (e.g., OSPF, RIP, and EIGRP) and inter-domain (e.g., BGP) routing.

Most packet-switched networks employ some form of shortest-path routing. The objective of shortest-path routing is to determine a least-cost path between a source and a destination. The cost can be hop count, delay, bandwidth, queue size, or combinations of these "metrics." Shortest-path routing algorithms are divided into two classes: distance vector and link state algorithms. As is known to those of ordinary skill in the art, distance-vector algorithms are derived from the Bellman-Ford shortest-path algorithm, and base path selection on local estimates of path costs. These algorithms are usually implemented in a distributed asynchronous fashion. On the other hand, link-state algorithms are derived from Dijkstra's shortest-path algorithm, and are usually implemented in a replicated fashion (i.e., each node performs an independent route computation) and construct paths based on global estimates of individual link costs.

As packet-switched networks grow to accommodates an increasing user population, the amount of routing information that must be distributed, stored, and manipulated in these networks also grows. Research on routing in large packet-switched networks has focused on ways to reduce the quantity of routing information, without sacrificing the quality of a selected path. The majority of proposed and deployed solutions use algorithms for hierarchical clustering of topology information, abstraction of routing information relating to these clusters, and packet forwarding within the hierarchy.

Routing algorithms deployed in today's Internet focus on basic connectivity and typically support only one type of datagram service-best effort service. Moreover, current Internet routing protocols, such as BGP, OSPF, and RIP, use "shortest path routing" (i.e., routing that is optimized for a single metric, such as administrative weight or hop count). These routing protocols are also "opportunistic," which means that they use the current shortest path or route to a destination. In order to avoid loops, alternative paths with adequate but less than optimal cost cannot be used to route traffic. However, it should be noted that shortest path routing protocols do allow a router to alternate among several equal cost paths to a destination.

There are typically two methods to achieve high network throughput: conserving resources and balancing traffic load. To conserve resources, it is desirable to select paths that required the fewest possible hops, or which require the least amount of bandwidth. On the other hand, to balance the network load, it is desirable to select the least loaded paths. In practice, these two methods often conflict with each other, and tradeoffs must be made between load balancing and resource conserving resources.

Packet-switched networks may be subdivided into two general categories: virtual circuit networks and datagram networks. In a virtual circuit network (e.g., an Asynchronous Transfer Mode, or "ATM" network), a connection is set up before data transmission starts and is torn down after data transmission is completed. All packets for a connection are transmitted in sequence from the source to the destination. In such a network, state information is maintained at every node along the path of the virtual circuit. This state information can be made available to admission control, resource reservation, and Quality of Service ("QoS") routing components of the network. In contrast, in a connectionless datagram network such as the Internet, all information 10' needed to deliver a packet is carried in the packet header, and individual forwarding decisions are made as packets arrive in a switch or a router. No connection state information is maintained inside the network.

The concept of a connection still exists on the end-systems, but there is no explicit connection setup and tear down inside the network. It is possible that different packets of the same connection may be sent over different paths from the source to the destination.

Without state information inside the network, it is difficult for a network to provide end-to-end QoS guarantees. In order to provide these guarantees, the current trend is to maintain per-session state information or the aggregation of this state information in the network. State information can be maintained in two ways. Soft state refers to state that is periodically refreshed by the reservation protocol deployed in the network, so, when lost, the state will be automatically reinstated. For example, in the RSVP protocol mentioned earlier, two kinds of soft state information are maintained: path state and reservation state. Each data source periodically sends a path message that establishes or updates the path state, while each receiver periodically sends a reservation message that establishes or updates the reservation state. In contrast, hard state, such as the state maintained in an ATM network, is established at connection setup time and is maintained for the lifetime of the connection. Researchers have suggested maintaining per-flow state only at the edge of a network, while the network core maintains only aggregated state information.

As is known to those of ordinary skill in the art, the next generation of the Internet Protocol (known as "IPv6") provides enhancements over the capabilities of the existing Internet Protocol version 4 ("IPv4") service. Specifically, IPv6 adds capabilities to label packets belonging to particular traffic "flows." A flow in IPv6 is a sequence of packets sent from a particular source to a particular destination. For example, the 24 bit Flow Label field in the IPv6 header may be used by a source to label those packets for which it requests special handling by the IPv6 routers, such as non-default quality of service or "real-time" service. The nature of that special handling might be conveyed to the routers by a control protocol such as RSVP, or by information within the packets comprising the flow (e.g., in a hop-by-hop option).

As used herein, the term "flow" refers to the concept of a virtual circuit in ATM networks aid of a flow in IP networks. Thus, a "flow" can be a hard-state virtual circuit as in an ATM network, a soft-state flow as defined in IPv6, or a stateless connection such as a TCP connection in an IP network. A flow (also called a "session") may use either a single path or multiple paths. For traffic requiring resource guarantees, it is assumed that the traffic source specifies its traffic characteristics and desired performance guarantees. The network performs admission control to decide if the traffic should be admitted. Once a flow is admitted, resources along its path are reserved through a reservation protocol, such as RSVP.

For the purposes of the present invention, there are two different types of flows: guaranteed flows and best-effort flows. Guaranteed flows require QoS guarantees in terms of delay, delay jitter, and bandwidth. In contrast, best-effort flows require no firm QoS guarantees but expect the network to deliver packets to their destinations as quickly as possible. For guaranteed flows, there are two different types of QoS requirements: bandwidth guarantees and delay guarantees. For best-effort flows, there are two subclasses: high-bandwidth traffic and low latency traffic.

Best-effort traffic has been and will continue to be the main traffic class in data networks for the foreseeable future. However, with the increasing data sizes used by applications and the increased network capacity, large data sets from a few megabytes to several gigabytes are often transmitted over the network. In contrast to traditional best-effort traffic, such as electronic mail, telnet, and small file transfers, this new class of applications can send data at a high burst rate and can make use of the high bandwidth available in the network. This new class of traffic is known as high-bandwidth traffic, traditional best-effort traffic is referred to as low-latency traffic.

Ideally, both high-bandwidth and low-latency traffic should be transmitted in the minimum possible time, but the factors that affect the elapsed time are different for each class of traffic. A low-latency message may consist of only a few packets, and the packets should be sent to their destination with the minimum per-packet end-to-end delay to achieve the minimum elapsed time. For high-bandwidth traffic, however, a message can consist of hundreds or thousands of packets. When sending these packets to their destinations, the available bandwidth on the path will dominate the elapsed time. Given the different traffic characteristics and the different dominating factors determining the performance of low-latency traffic and high-bandwidth traffic, the network should provide explicit support to optimize user satisfaction as well as network resource utilization efficiency for these two classes of traffic.

Among guaranteed traffic flows, a distinction may be made between those that require only bandwidth guarantees and those that also require delay guarantees. For a flow requiring bandwidth guarantees, the requested bandwidth may either be the mini bandwidth or the average bandwidth. However as is known to those of ordinary skill in the art, for a flow requiring delay guarantees, the QoS requirements also include delay, delay jitter, and loss. To provide such QoS guarantees, the network needs to reserve a certain amount of bandwidth at each node on the path from the source to the destination. In many cases, much more bandwidth than the average traffic rate may have to be reserved if the requested delay bound is tight and the traffic source is bursty. In this case, the reserved but unused bandwidth may be used opportunistically by other flows in the network. Ensuring that the link share for each flow corresponds to its requested QoS is the responsibility of specialized scheduling algorithms known to those of ordinary skill in the art, which are not discussed herein.

Figures 7, 8:
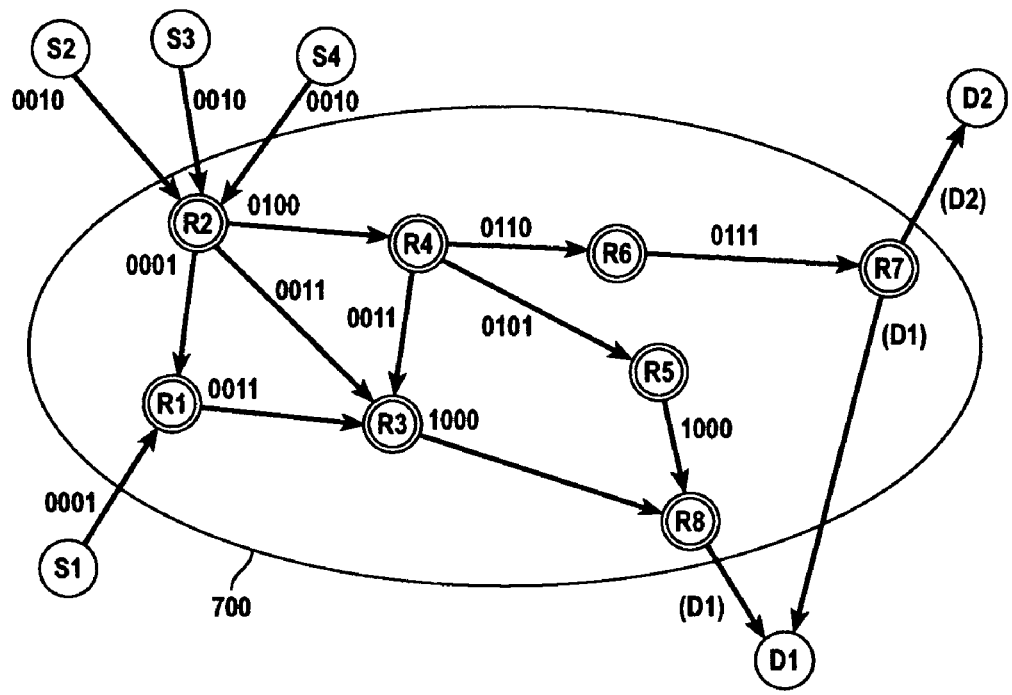
FIG. 7 is a block diagram illustrating an exemplary network in which an embodiment of the present invention has been implemented.
FIG. 8 is a block diagram illustrating the structure of an exemplary Explicit Route Table ("ERT") according to aspects of the present invention.

Having described various contexts in which aspects of the present invention may be implemented, one simplified embodiment of the invention is now described. FIG. 7 is a block diagram illustrating an exemplary network 700 in which an embodiment of the present invention has been implemented. As shown in FIG. 7, exemplary network 700 comprises eight routers R1-R8 interconnected in a specific manner. Naturally, neither the number of routers nor the manner in which they are interconnected is critical. It should also be noted that the routers shown in exemplary network 700 may or may not all be within the same domain, as that term was used earlier in this document. The only requirement is that network 700 should be defined in such a way that it is possible to determine routes through the network, given a source and destination pair. Four sources S1-S4 and two destinations D1-D2 are connected to exemplary network 700, as shown in the figure. Sources S1-S4 and destinations D1-D2 may be client or server computers, other routers, or any other kind of network device identifiable by a unique address.

For the sake of simplicity, data flows through the network are shown as unidirectional arrows. In the simplified example shown in FIG. 7, each network segment (i.e., each direct connection from one node to another node) is labeled with the binary number representing the router number of the destination for each segment (e.g., the segments between S2 and R2, S3 and R2, S4 and R2 are all labeled as "0010," while the segment between R3 and R8 is labeled as "1000"). In a practical implementation, the network segments may be labeled with a number representing the IP address of the appropriate next hop. In general, each router can forward an incoming packet to a variety of destinations, although only R2 and R4 are shown as having multiple output ports in the simplified diagram shown in FIG. 7.

In FIG. 7, R1 and R2 are "ingress routers" in the sense that they are the only network nodes into which packets may arrive from outside network 700. Router R1 receives data packets from source S1, while router R2 receives data packet from sources S2-S4. In the context of the present invention, all other routers in the network (i.e., R3-R8) are considered to be "core routers." Packets exit the network at routers R7 and R8, with destination D1 being accessible from both R7 and R8, but destination D2 only being accessible from R7. The network segments terminating in D1 and D2 are not given the usual labels, because they are directly connected to one or more network routers (i.e., R7 can typically determine that it is directly connected to D1 and D2, and R8 can typically determine that it is directly connected to D1).

As is well known to those of ordinary skill in the art, there are many different possible routes from each source S1-S4 to each destination D1-D2. Determining the optimal route from each source to each destination, based on various factors known to those of ordinary skill in the art, is the quintessential function performed by routing algorithms, such as the various routing algorithms that have been described in this document. The specific type or types of routing algorithms used in network 700 are not important in the context of the present invention. The only requirement is that some sort of routing algorithm is implemented, which can be used to determine the route from each source to each destination. Moreover, as mentioned earlier, these routes can be dynamically recalculated based on various factors known to those of ordinary skill in the art.

As an example, assume that, at any given point in time, whatever routing algorithms are being used in network 700 shown in FIG. 7 determine that the following explicit routes should be used for the following source and destination pairs:

| SOURCE/DESTINATION PAIR | EXPLICIT ROUTE |
| --- | --- |
| <S1, D1> | R1, R3, R8 |
| <S2, D1> | R2, R3, R8 |
| <S3, D1> | R2, R4, R3, R8 |
| <S4, D1> | R2, R1, R3, R8 |
| <S2, D2> | R2, R4, R6, R7 |

According to aspects of the present invention, each of the above explicit routes can be assigned a "global path identifier" (or "global path ID") by performing a bit-wise Exclusive-Or ("XOR") function of all the labels of the network segments along the route. Thus, the global path ID for <S1, D1> would be calculated by calculating the bit-wise XOR function of the network segments along the route defined by "R1, R3, R8," as follows:

Global path ID<S1,
    D1>=0001XOR0011XOR1000=1010

Similarly, the global path ID's for the remaining routes defined above are calculated as follows:

Global path ID<S2,
    D1>=0010XOR0011XOR1000=1001

Global path ID<S3,
    D1>=0010XOR0100XOR0011XOR1000=1101

Global path ID<S4,
    D1>=0010XOR0001XOR0011XOR1000=1000

Global path ID<S2,
    D2>=0010XOR0100XOR0110XOR0111=0111

Thus, even from this simplified example, it can be seen that unique global path ID's (with a high degree of probability) can be assigned to each route. As mentioned earlier, a practical implementation would use the IP address of each appropriate hop along the route instead of the simple 4 bit binary numbers used in the above example. As those of ordinary skill in the art will recognize, this approach can be used with binary numbers having any arbitrary number of bits.

According to aspects of the present invention, each ingress router maintains an Explicit Route Table ("ERT") which, given a source/destination pair, provides an ordered list of the network devices along the corresponding explicit route and a global path ID that is assigned to that route. An exemplary ERT is shown in FIG. 8, containing the values calculated above with reference to exemplary network 700 shown in FIG. 7. As shown in FIG. 8, ERT 800 comprises a source/destination pair column 810, a route column 820, and a global path ID column 830. To conserve memory space, each ingress router would typically contain only entries that pertain to each specific ingress router. Thus, for example, in the table shown in FIG. 8, only the <S1, D1> entry would appear in the ERT of router R1, while only the remaining entries would appear in the ERT of router R2.

Figures 9, 10:
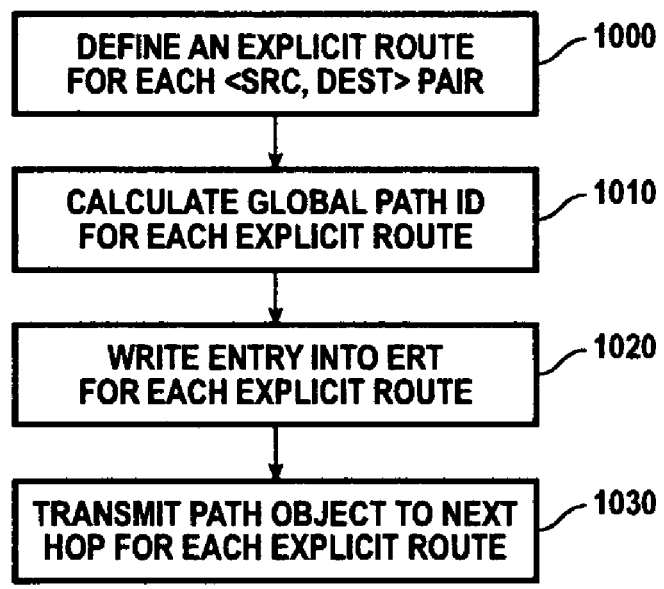
FIG. 9 is block diagram illustrating the structure of an exemplary Explicit Forwarding Information Base ("EFIB") according to aspects of the present invention.
FIG. 10 is a flow chart illustrating the process of setting up an ERT according to an embodiment of the present invention.

According to aspects of the present invention, in one embodiment, each core router in the network maintains an Explicit Forwarding Information Base ("EFIB") instead of an ERT. FIG. 9 is block diagram illustrating the structure of an exemplary EFIB. As shown in FIG. 9, EFIB 900 comprises an incoming global path ID column 910, and outgoing global path ID column 920, and a next hop column 930. As will be described more fully below, given an incoming global path ID in a data packet, EFIB 900 provides the corresponding global path ID and the next hop to which the incoming data packet should be routed. In one embodiment, the outgoing global path ID is calculated by performing a bit-wise XOR function of the incoming global path ID with the identifying number of the current node (e.g., the IP address of the appropriate port on the current router, in a practical implementation). Depending on each particular implementation, this calculation may be performed as part of the table initialization process (i.e., when each path object is propagated downstream), or may be calculated "on the fly" as each packet arrives. In the case of "on the fly" calculation, the outgoing global path ID column 920 of EFIB 900 shown in FIG. 9 is not necessary.

As those of ordinary skill in the art will recognize, due to mathematical properties of the XOR function, this calculation guarantees that whenever routes merge in the network, the global path ID's associated with the routes will also merge. In accordance with these properties, the outgoing global path ID can be easily obtained simply by performing a bit-wise XOR function of the incoming global path ID with the identifying number of the current node (e.g., the IP address of the appropriate port on the current router, in a practical implementation).

Thus, using the global path ID as defined above, once two routes merge, only a single entry in the EFIB is needed for all of the routes that merge at a given node. This is significant because the number of entries required in the EFIB is thus greatly reduced, resulting in a scalable solution. According to the present invention, the size of the EFIB is proportional to the number of different routes used, and is independent of number of flows in the network.

As an example, FIG. 9 illustrates the EFIB for router R1 shown in FIG. 7. Using the same examples and defined explicit routes as above, there are two explicit routes defined that pass through router R1: the route corresponding to <S1, D1> (i.e., route R1, R3, R8), and the route corresponding to <S4, D1> (i.e., route R2, R1, R3, R8). It should be noted that these two routes "merge" at router R1. It can easily be shown by those of ordinary skill in the art that the global path ID's for these two routes also merge at R1 to the value of "1010," that the corresponding outgoing global path ID at the output of router R1 would be "1011," and that the next hop for both routes would therefore be router R3. Therefore, the single entry shown in FIG. 9 illustrates the "merging" effect of the global path ID's, because this single entry corresponds to all routes that merge at router R1.

Before packets can be forwarded according to aspects of the present invention, the ERT and EFIB tables must be set up. FIG. 10 is a flow chart illustrating the process of setting up an ERT at an ingress router according to an embodiment of the present invention. At step 1000, an explicit route is defined for a source/destination pair using any method known to those of ordinary skill in the art. The route selection can be made on a per-flow basis or on a per-class basis. Moreover, a traffic flow or a traffic class can use multiple routes simultaneously. As has already been mentioned, the techniques according to the present invention are independent of path selection algorithms that are used to select explicit routes. At step 1010, the global path ID for each explicit route defined is calculated by performing a bit-wise XOR function of all of the network segments along the route, in the manner described earlier. At step 1020, an entry is written into the ERT of the ingress router for each explicit route that enters the network at that specific ingress router (e.g., in the example shown in FIG. 7, only routes from S1 to either D1 or D2 would be included in the ERT of router R1).

At step 1030, for each explicit route in the ERT of an ingress router, a path object is transmitted downstream to the next hop along the explicit route, using either the reliable forwarding mode or the unreliable mode. In the former case, the path objects are forwarded to the next hop using reliable transmission (e.g., TCP), which is similar to link state update techniques used in the BGP protocol, as is known to those of ordinary skill in the art. In one embodiment, path objects are maintained as soft state, and may be transmitted periodically from an ingress node such as an edge router in case table entries have been flushed out and lost for any reason.

As mentioned earlier, according to aspects of the present invention, core routers in the network maintain an. Explicit FIB ("EFIB"), which is indexed by an incoming global path ID. This EFIB may be implemented as either a separate routing table (analogous to using a TIB in tag switching approaches known to those of ordinary skill in the art), or as an extension of the existing FIB in typical routers.

Figure 11:
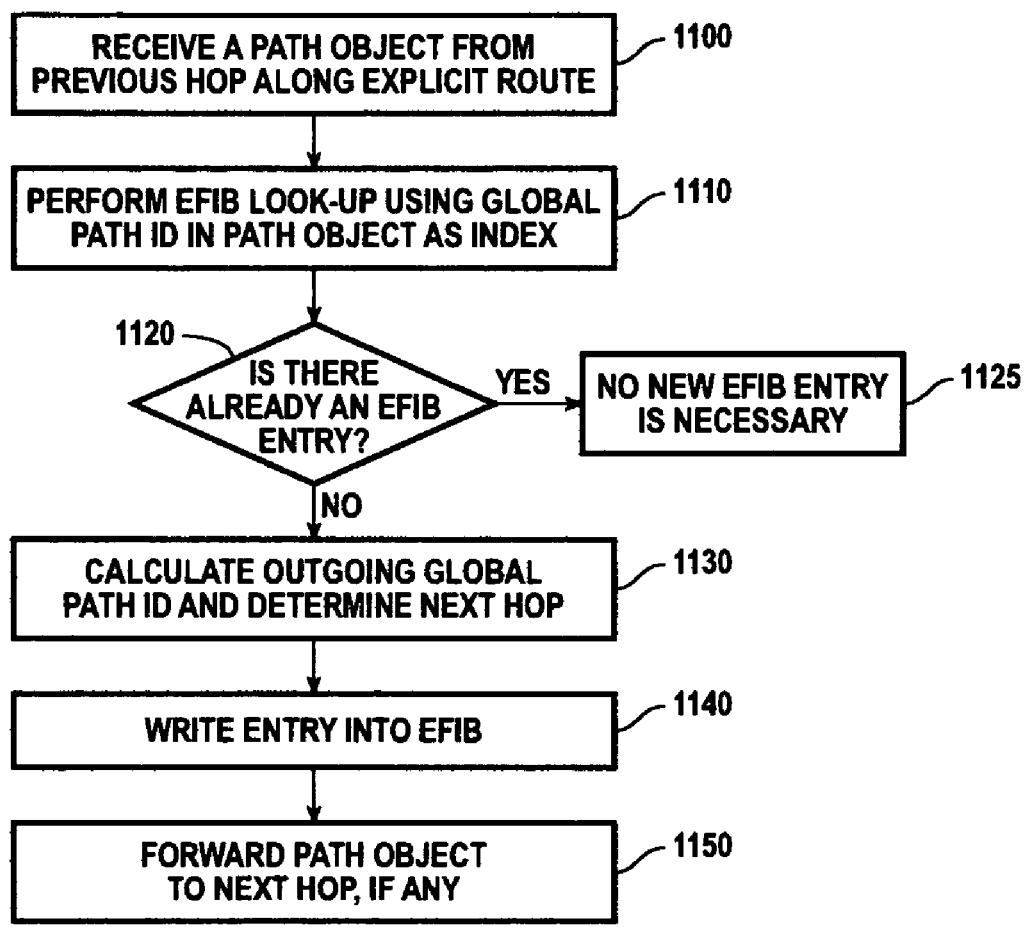
FIG. 11 is a flow chart illustrating the process of setting up an EFIB according to an embodiment of the present invention.

FIG. 11 is a flow chart illustrating the process of setting up an EFIB at a core router according to one embodiment of the present invention. At step 1100, a path object is received from the previous hop along an explicit route. At step 1110, a look up is performed on the EFIB of the receiving router using the global path ID in the received path object as an index. At step 1120, a decision is made depending on whether an entry indexed by the global path ID in the received path object already exists or not. If an entry already exists, then the process ends at step 1125, at which point a determination is made that a new EFIB in not necessary, probably because the received path object relates to a path that merges at the router receiving the path object.

At step 1130, if the EFIB entry does not already exist, then the corresponding outgoing global path ID is calculated by performing a bit-wise XOR function of the incoming global path ID with the ID of the receiving router (e.g., the IP address of the corresponding port on the receiving router), and the next hop is determined based on the explicit route information contained in the received path object. At step 1140, the resulting EFIB entry information is written into the EFIB, and the path object is forwarded to the next hop along the explicit route, if necessary, at step 1150.

Figure 12:
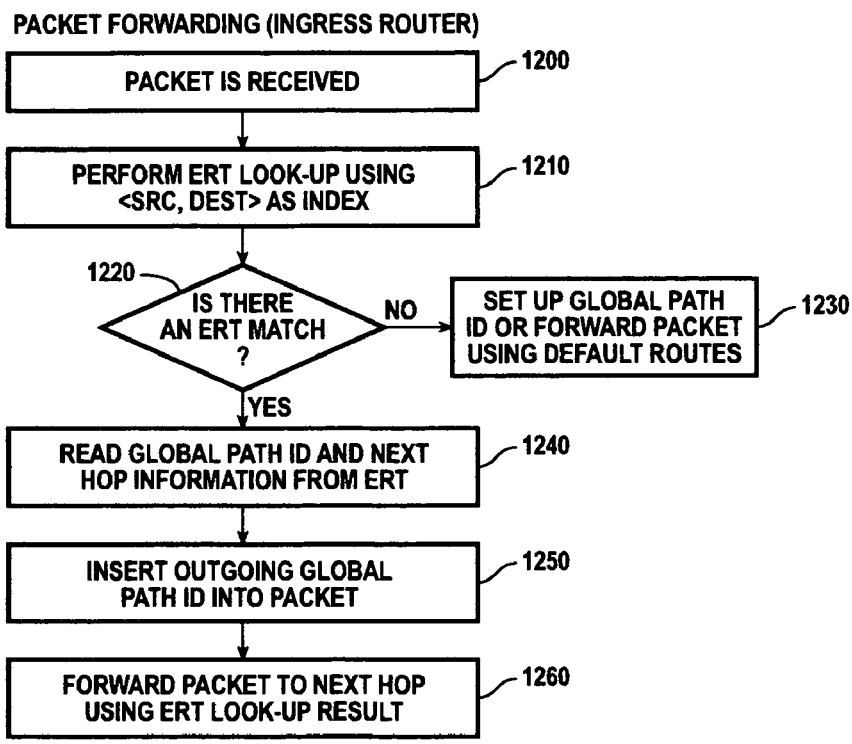
FIG. 12 is a flow chart illustrating the packet forwarding process at an ingress router according to an embodiment of the present invention.

FIG. 12 is a flow chart illustrating the packet forwarding process at an ingress router according to an embodiment of the present invention. At step 1200, a packet is received at an ingress router. At step 1210, a look-up is performed on the ERT of the ingress router using the <source, destination> data pair contained in the received packet as an index. At step 1220, a decision is made depending on whether a match is found in the ERT. At step 1230, if no match is found, then a global path D may be set up in the ERT in the manner described earlier with reference to FIG. 10. Alternatively, the packet may be forwarded using default routes, if available.

At step 1240, if a match is found in the ERT, then the appropriate global path ID corresponding to the <source, destination> pair is retrieved from the ERT, along with information identifying the next hop along the appropriate explicit route. At step 1250, the global path ID is inserted into the packet as the outgoing global path ID, and at step 1260, the packet is forwarded to the next hop along the explicit route based on the next hop information retrieved from the ERT.

Figure 13:
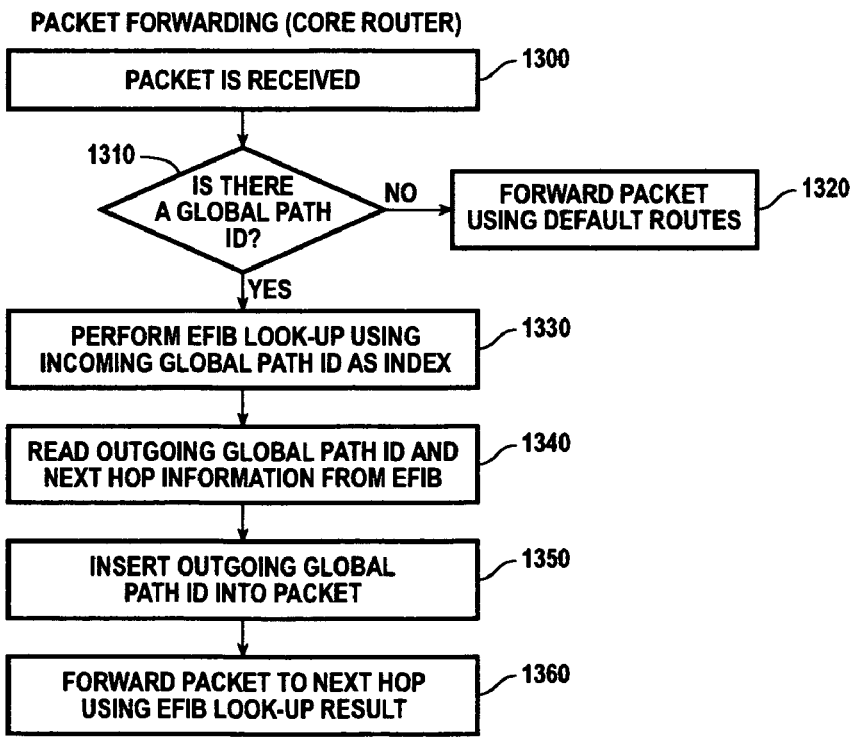
FIG. 13 is a flow chart illustrating the packet forwarding process at a core router according to an embodiment of the present invention.

FIG. 13 is a flow chart illustrating the packet forwarding process at a core router according to an embodiment of the present invention. At step 1300, a router along an explicit path receives a packet from the previous hop along the path. At step 1310, the router determines whether the received packet contains a global path ID according to the present invention. If not (e.g., if the field where the global path ID is expected is empty or invalid), at step 1320, the process shown in FIG. 13 terminates, and the packet is forwarded using the default routes provided by the underlying routing algorithms, such as OSPF or BGP. However, if at step 1310, it is determined that the packet contains a global path ID according to aspects of the present invention, at step 1330 a look-up is performed on the EFIB of the receiving router using the global ID of the received packet as an index. Assuming there is a match in the EFIB, at step 1340, the corresponding outgoing global path ID and next hop information (both of which should have been previously written into the EFIB in the manner described earlier with reference to FIG. 11) are extracted from the EFIB. At step 1350, the global path ID in the packet is replaced with the new outgoing global path ID retrieved from the EFIB, and at step 1360, the packet is forwarded to the next hop using the next hop information retrieved from the EFIB.

As those of ordinary skill in the art will recognize, a benefit of the present invention is that, unlike other routing techniques, explicit route tear down is not required. To support rerouting, a new path object is simply sent downstream to modify the entries in the EFIB, and a new global path ID is calculated. Packets using the new route are then inserted into the network with new global path ID.

As described herein, the present invention discloses a novel approach to support dynamic selection of explicit routes and dynamic rerouting in the Internet. The proposed technique is simple and scalable. It can support both flow-based and class-based dynamic traffic engineering. The technique is independent of existing routing protocols, but uses the route selected by existing routing protocols as default routes. Hence, it can be used in both intra-domain (e.g., OSPF, RIP, and EIGRP) and inter-domain (e.g., BGP) routing. Dynamic rerouting typically implies high implementation complexity and operational overhead. The proposed technique makes rerouting simple and relatively inexpensive.

As those of ordinary skill in the art will recognize, the techniques proposed in the present invention significantly reduce the complexity of traffic engineering as currently proposed in the IETF. Compared with other approaches known to those of ordinary skill in the art, the new techniques according to the present invention are independent of the underlying routing protocol, scalable (i.e., they require a small EFIB size and support flow aggregation), and dynamic (i.e., they can support both class-based and flow-based explicit routes).

The techniques described herein according to aspects of the present invention may be implemented in routers or in any device having a plurality of output interfaces that forwards incoming data to one or more of these output interfaces. As is known to those of ordinary skill in the art, the program code which may be required to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for routing a data packet through an explicit path in a data communication network, the data packet having an incoming global path identifier corresponding to the explicit path, the data communication network comprising a plurality of network nodes, each of the plurality of network nodes including a network device, the explicit path comprising a plurality of hops including a prior hop, a current hop, and a next hop, each of the plurality of hops being associated with one of the plurality of network nodes, the method comprising:

receiving the data packet from the prior hop at the current hop in the network device;

performing a look-up function into a forwarding table using an index based on the incoming global path identifier to determine a forwarding table entry related to the next hop to which the data packet should be forwarded;

extracting an outgoing global path identifier for the data packet from the forwarding table entry, wherein the outgoing global path identifier for the data packet has been pre-calculated as a function of (1) the incoming global path identifier and (2) an identifier of the network device receiving the data packet at the current hop;

replacing the incoming global path identifier with the outgoing global path identifier in the data packet; and forwarding the data packet to the next hop.

2. The method as defined in claim 1, wherein there are two explicit paths that merge at a network node and share a single same entry in the forwarding table in all downstream network nodes.

3. The method as defined in claim 2, wherein the network device has assigned to it an Internet Protocol ("IP") address as the identifier of the network device and the outgoing global path identifier is calculated by performing a bit-wise Exclusive-Or function on the incoming global path identifier and the IP address.

4. The method as defined in claim 2, wherein the outgoing global path identifier is inserted into an optional field of an Internet Protocol ("IP") packet header for the data packet.

5. The method as defined in claim 4, wherein the network device has assigned to it an IP address as the identifier of the network device and the outgoing global path identifier is calculated by performing a bit-wise Exclusive-Or function on the incoming global path identifier and the IP address.

6. The method as defined in claim 1, wherein the network device has assigned to it an Internet Protocol ("IP") address as the identifier of the network device and the outgoing global path identifier is calculated by performing a bit-wise Exclusive-Or function on the incoming global path identifier and the IP address.

7. The method as defined in claim 1, wherein the outgoing global path identifier is inserted into an optional field of an Internet Protocol ("IP") packet header for the data packet.

8. The method as defined in claim 7, wherein the network device has assigned to it an IP address as the identifier of the network device and the outgoing global path identifier is calculated by performing a bit-wise Exclusive-Or function on the incoming global path identifier and the IP address.

9. An apparatus for routing a data packet through an explicit path in a data communication network, the data packet having an incoming global path identifier corresponding to the explicit path, the data communication network comprising a plurality of network nodes, each of the plurality of network nodes including a network device, the explicit path comprising a plurality of hops including a prior hop, a current hop, and a next hop, each of the plurality of hops being associated with one of the plurality of network nodes, the apparatus comprising:

means for receiving the data packet from the prior hop at the current hop in the network device;

means for performing a look-up function into a forwarding table using an index based on the incoming global path identifier to determine a forwarding table entry related to the next hop to which the data packet should be forwarded;

means for extracting an outgoing global path identifier for the data packet from the forwarding table entry, wherein the outgoing global path identifier for the data packet has been pre-calculated as a function of (1) the incoming global path identifier and (2) an identifier of the network device receiving the data packet at the current hop;

means for replacing the incoming global path identifier with the outgoing global path identifier in the data packet; and means for forwarding the data packet to the next hop.

10. The apparatus as defined in claim 9, wherein there are two explicit paths that merge at a network node and share a single same entry in the forwarding table in all downstream network nodes.

11. The apparatus as defined in claim 10, wherein the network device has assigned to it an Internet Protocol ("IP") address as the identifier of the network device and the outgoing global path identifier is calculated by performing a bit-wise Exclusive-Or function on the incoming global path identifier and the IP address.

12. The apparatus as defined in claim 10, wherein the outgoing global path identifier is inserted into an optional field of an Internet Protocol ("IP") packet header for the data packet.

13. The apparatus as defined in claim 12, wherein the network device has assigned to it an IP address as the identifier of the network device and the outgoing global path identifier is calculated by performing a bit-wise Exclusive-Or function on the incoming global path identifier and the IP address.

14. The apparatus as defined in claim 9, wherein the network device has assigned to it an Internet Protocol ("IP") address as the identifier of the network device and the outgoing global path identifier is calculated by performing a bit-wise Exclusive-Or function on the incoming global path identifier and the IP address.

15. The apparatus as defined in claim 9, wherein the outgoing global path identifier is inserted into an optional field of an Internet Protocol ("IP") packet header for the data packet.

16. The apparatus as defined in claim 15, wherein the network device has assigned to it an IP address as the identifier of the network device and the outgoing global path identifier is calculated by performing a bit-wise Exclusive-Or function on the incoming global path identifier and the IP address.

17. An apparatus for routing a data packet through an explicit path in a data communication network, the data packet having an incoming global path identifier corresponding to the explicit path, the data communication network comprising a plurality of network nodes, each of the plurality of network nodes including a network device, the explicit path comprising a plurality of hops including a prior hop, a current hop, and a next hop, each of the plurality of hops being associated with one of the plurality of network nodes, the apparatus comprising:

an input interface for receiving the data packet from the prior hop at the current hop in the network device;

table search logic for performing a look-up function into a forwarding table using an index based on the incoming global path identifier to determine a forwarding table entry related to the next hop to which the data packet should be forwarded;

path identifier assignment logic which extracts an outgoing global path identifier for the data packet from the forwarding table entry, wherein the outgoing global path identifier for the data packet has been pre-calculated as a function of (1) the incoming global path identifier and (2) an identifier of the network device receiving the data packet at the current hop;

path identifier insertion logic which replaces the incoming global path identifier with the outgoing global path identifier in the data packet; and packet forwarding logic for forwarding the data packet to the next hop.

18. The apparatus as defined in claim 17, wherein there are two explicit paths that merge at a network node and share a single same entry in the forwarding table in all downstream network nodes.

19. The apparatus as defined in claim 18, wherein the network device has assigned to it an Internet Protocol ("IP") address as the identifier of the network device and the outgoing global path identifier is calculated by performing a bit-wise Exclusive-Or function on the incoming global path identifier and the IP address.

20. The apparatus as defined in claim 18, wherein the outgoing global path identifier is inserted into an optional field of an Internet Protocol ("IP") packet header for the data packet.

21. The apparatus as defined in claim 20, wherein the network device has assigned to it an IP address as the identifier of the network device and the outgoing global path identifier is calculated by performing a bit-wise Exclusive-Or function on the incoming global path identifier and the IP address.

22. The apparatus as defined in claim 17, wherein the network device has assigned to it an Internet Protocol ("IP") address as the identifier of the network device and the outgoing global path identifier is calculated by performing a bit-wise Exclusive-Or function on the incoming global path identifier and the IP address.

23. The apparatus as defined in claim 17, wherein the outgoing global path identifier is inserted into an optional field of an Internet Protocol ("IP") packet header for the data packet.

24. The apparatus as defined in claim 23, wherein the network device has assigned to it an IP address as the identifier of the network device and the outgoing global path identifier is calculated by performing a bit-wise Exclusive-Or function on the incoming global path identifier and the IP address.

25. A program storage device readable by a machine, tangibly embodying a program of instructions executable by the machine to perform a method of routing a data packet through an explicit path in a data communication network, the data packet having an incoming global path identifier corresponding to the explicit path, the data communication network comprising a plurality of network nodes, each of the plurality of network nodes including a network device, the explicit path comprising a plurality of hops including a prior hop, a current hop, and a next hop, each of the plurality of hops being associated with one of the plurality of network nodes, the method comprising:

receiving the data packet from the prior hop at the current hop in the network device;

performing a look-up function into a forwarding table using an index based on the incoming global path identifier to determine a forwarding table entry related to the next hop to which the data packet should be forwarded;

extracting an outgoing global path identifier for the data packet from the forwarding table entry, wherein the outgoing global path identifier for the data packet has been pre-calculated as a function of (1) the incoming global path identifier and (2) an identifier of the network device receiving the data packet at the current hop;

replacing the incoming global path identifier with the outgoing global path identifier in the data packet; and forwarding the data packet to the next hop.

26. A method for routing a data packet through at least one explicit path in a data communication network, the data packet having a source/destination data pair, the at least one explicit path having specified a plurality of network nodes that form a route from a source network node to a destination network node, the data communication network comprising a plurality of network nodes, the method comprising:

receiving the data packet having the source/destination data pair;

performing a look-up fraction into a forwarding table using an index based on the source/destination data pair to determine a forwarding table entry related to a next network node along the route to which the data packet should be forwarded;

extracting a global path identifier for the data packet from the forwarding table entry, wherein the global path identifier for the data packet has been pre-calculated for the at least one explicit path through the data communication network;

inserting the global path identifier into the data packet; and forwarding the data packet to the next network node.

27. The method as defined in claim 26, wherein the global path identifier is inserted into an optional field of an Internet Protocol ("IP") packet header for the data packet.

28. The method as defined in claim 27, wherein each of the plurality of network nodes has assigned to it an IP address and the global path identifier is calculated by performing a bit-wise Exclusive-Or function on the IP addresses of the plurality of network nodes comprising the at least one explicit path.

29. The method as defined in claim 26, wherein each of the plurality of network nodes has assigned to it an Internet Protocol ("IP") address and the global path identifier is calculated by performing a bit-wise Exclusive-Or function on the IP addresses of the plurality of network nodes comprising the at least one explicit path.

30. An apparatus for routing a data packet through at least one explicit path in a data communication network, the data packet having a source/destination data pair, the at least one explicit path having specified a plurality of network nodes that form a route from a source network node to a destination network node, the data communication network comprising a plurality of network nodes, the apparatus comprising:

means for receiving the data packet having the source/destination data pair;

means for performing a look-up function into a forwarding table using an index based on the source/destination data pair to determine a forwarding table entry related to a next network node along the route to which the data packet should be forwarded;

means for extracting a global path identifier for the data packet from the forwarding table entry, wherein the global path identifier for the data packet has been pre-calculated for the at least one explicit path through the data communication network;

means for inserting the global path identifier into the data packet; and means for forwarding the data packet to the next network node.

31. The apparatus as defined in claim 30, wherein the global path identifier is inserted into an optional field of an Internet Protocol ("IP") packet header for the data packet.

32. The apparatus as defined in claim 31, wherein each of the plurality of network nodes has assigned to it an IP address and the global path identifier is calculated by performing a bit-wise Exclusive-Or function on the IP addresses of the plurality of network nodes comprising the at least one explicit path.

33. The apparatus as defined in claim 30, wherein each of the plurality of network nodes has assigned to it an Internet Protocol ("IP") address and the global path identifier is calculated by performing a bit-wise Exclusive-Or function on the IP addresses of the plurality of network nodes comprising the at least one explicit path.

34. An apparatus for routing a data packet through at least one explicit path in a data communication network, the data packet having a source/destination data pair, the at least one explicit path having specified a plurality of network nodes that form a route from a source network node to a destination network node, the data communication network comprising a plurality of network nodes, the apparatus comprising:

an input interface for receiving the data packet having the source/destination data pair;

table search logic for performing a look-up function into a forwarding table using an index based on the source/destination data pair to determine a forwarding table entry related to a next network node along the route to which the data packet should be forwarded;

global path identifier assignment logic which extracts a global path identifier for the data packet from the forwarding table entry, wherein the global path identifier for the data packet has been pre-calculated for the at least one explicit path through the data communication network;

global path identifier insertion circuitry for inserting the global path identifier into the data packet; and packet forwarding logic for forwarding the data packet to the next network node.

35. The apparatus as defined in claim 34, wherein the global path identifier is inserted into an optional field of an Internet Protocol ("IP") packet header for the data packet.

36. The apparatus as defined in claim 35, wherein each of the plurality of network nodes has assigned to it an IP address and the global path identifier is calculated by performing a bit-wise Exclusive-Or function on the IP addresses of the plurality of network nodes comprising the at least one explicit path.

37. The apparatus as defined in claim 34, wherein each of the plurality of network nodes has assigned to it an Internet Protocol ("IP") address and the global path identifier is calculated by performing a bit-wise Exclusive-Or function on the IP addresses of the plurality of network nodes comprising the at least one explicit path.

38. A program storage device readable by a machine, tangibly embodying a program of instructions executable by the machine to perform a method for routing a data packet through at least one explicit path in a data communication network, the data packet having a source/destination data pair, the at least one explicit path having specified a plurality of network nodes that form a route from a source network node to a destination network node, the data communication network comprising a plurality of network nodes, the method comprising:

receiving the data packet having the source/destination data pair;

performing a look-up function into a forwarding table using an index based on the source/destination data pair to determine a forwarding table entry related to a next network node along the route to which the data packet should be forwarded;

extracting a global path identifier for the data packet from the forwarding table entry, wherein the global path identifier for the data packet has been pre-calculated for the at least one explicit path through the data communication network;

inserting the global path identifier into the data packet; and forwarding the data packet to the next network node.

* * * * *